(12) United States Patent
Popa et al.

(10) Patent No.: US 7,713,561 B2
(45) Date of Patent: May 11, 2010

(54) OIL RESISTANT PACKAGING

(75) Inventors: Marcia A. Popa, Edina, MN (US);
Randal J. Monforton, Minnetrista, MN (US); David W. Plank, Taylors Falls, MN (US); Jonathan W. Devries, Coon Rapids, MN (US)

(73) Assignee: Diamond Foods, Inc., Stockton, CA (US)

( * ) Notice: Subject to any disclaimer, the term of this patent is extended or adjusted under 35 U.S.C. 154(b) by 522 days.

(21) Appl. No.: 11/674,688

(22) Filed: Feb. 14, 2007

(65) Prior Publication Data

US 2007/0196544 A1   Aug. 23, 2007

Related U.S. Application Data

(60) Provisional application No. 60/774,981, filed on Feb. 17, 2006.

(51) Int. Cl.
*B65D 81/34* (2006.01)

(52) U.S. Cl. ............ 426/113; 428/34.2; 428/34.3

(58) Field of Classification Search ............ 426/113
See application file for complete search history.

(56) References Cited

U.S. PATENT DOCUMENTS

| | | | |
|---|---|---|---|
| 5,008,024 A | 4/1991 | Watkins et al. | |
| 5,044,777 A | 9/1991 | Watkins et al. | |
| 5,081,330 A | 1/1992 | Brandberg et al. | |
| 5,097,107 A | 3/1992 | Watkins et al. | |
| 5,195,829 A | 3/1993 | Watkins et al. | |
| 5,352,717 A | 10/1994 | Bergishagen | |
| 5,679,278 A | 10/1997 | Cox | |
| 5,834,046 A | 11/1998 | Turpin et al. | |
| 5,985,772 A * | 11/1999 | Wood et al. | 442/70 |
| 6,049,072 A | 4/2000 | Olson | |
| 6,126,976 A | 10/2000 | Hasse, Jr. | |
| 6,396,036 B1 | 5/2002 | Hanson | |
| 2002/0010154 A1 * | 1/2002 | Uchiyama et al. | 514/58 |
| 2005/0019475 A1 | 1/2005 | Plank et al. | |
| 2005/0025875 A1 | 2/2005 | Plank et al. | |
| 2005/0233054 A1 | 10/2005 | Plank et al. | |

* cited by examiner

*Primary Examiner*—Rena L Dye
*Assistant Examiner*—Chaim Smith
(74) *Attorney, Agent, or Firm*—Fenwick & West LLP

(57) ABSTRACT

Oil resistant package material and packages prepared therefrom have cyclodextrin incorporated in or adjacent to a film layer of the package to reduce the permeation of oil through the package material, and particularly out of the package. The film layer comprises a polymer that coordinates or bonds with a cyclodextrin compound in an amount sufficient to reduce the permeation of oil through the film layer as compared to a like film layer that does not contain cyclodextrin.

12 Claims, 2 Drawing Sheets

OIL RESISTANT PACKAGING

This application claims the benefit of U.S. Provisional Application Ser. No. 60/774,981, filed Feb. 17, 2006, entitled "OIL RESISTANT PACKAGING," which application is incorporated herein by reference in its entirety.

FIELD OF THE INVENTION

The present invention relates to packaging material that is oil resistant. More specifically, the present invention relates to package material comprising a film layer comprising a polymer coordinated or bonded with a cyclodextrin compound in an amount sufficient to reduce the permeation of oil through the film layer

BACKGROUND OF THE INVENTION

Cyclodextrins have been used principally for the encapsulation of insoluble compounds on a molecular basis in order to enhance stability, reduce volatility and alter solubility as well as to increase shelf life of certain products. Such prior uses of cyclodextrins have been limited to flavor carriers and protection of sensitive substances against thermal decomposition, oxidation and degradation. In addition, more recently, cyclodextrins have also been used to remove fatty acids and cholesterol from animal fats and to remove cholesterol and cholesterol esters from egg yolks.

Fat compositions have been thickened by binding the fat with cyclodextrin by mixing the fat with a cyclodextrin that has been solubilized by water in a batch process. This batch process is described in U.S. patent application Ser. No. 11/158,747; Titled: VISCOUS FAT COMPOSITIONS HAVING LOW AMOUNTS OF TRANS-FAT, METHODS AND PRODUCTS, filed JUN. 22, 2005. Additionally, the food product can be provided with cyclodextrin in the manner described in U.S. Patent Application No. 2005/0019475, titled "Reduced Trans Fat Product," published Jan. 27, 2005; US Patent Application No. 2005/0025875, titled "Treatment and Composition for Reducing Acrylamide in Food Products and Food Intermediates, published Feb. 3, 2005; and US Patent Application No. 2005/0233054, titled "Method for Reducing Trans Fat Levels in Food Products and Food Intermediates and Products and Intermediates Produced Thereby," published Oct. 20, 2005.

The incorporation of cyclodextrin or a complex of cyclodextrin and blowing agent into an adhesive and/or sealant plastic material in order to improve adhesion is described in U.S. Pat. No 5,352,717. Possible blowing agents include water. The composition is applied and heated to activate the blowing agent, which produces gasses that expands the adhesive or sealant. This means that the final film in place on the substrate as claimed in this patent cannot contain a cyclodextrin/water complex. Additionally, because the blowing agent is claimed to occupy the interior of the cyclodextrin, a different material cannot be used provided as an inclusion complex.

U.S. Pat. No. 5,985,772 describes packaging systems containing a barrier layer that can act both as a barrier to the passage of a permeant and as a trap for contaminant materials that can arise in new materials or from the recycle of fiber in the manufacture of paperboard. The effective material which acts as a trap or barrier is a cyclodextrin compound, substantially free of an inclusion complex compound. The cyclodextrin barrier layer can be corrugated or sheet laminated with or on the cellulosic web. Alternatively, the cyclodextrin material can be included in a coating composition that is coated on the surface or both surfaces of the cellulosic web after web formation. Further, the cyclodextrin material can be included in a thermoplastic film that can be used as one layer in a bilayer or multilayer laminate containing a cellulosic web.

A microwaveable container is described in U.S. Pat. No. 5,679,278. The container is formed of a three part laminate structure including a middle layer of plastic that is impervious to liquid oils, water vapor, gas, and moisture, an inner layer of fibrous material joined to one side of the middle layer, and an outer fibrous layer joined to the other side of the middle layer.

SUMMARY OF THE INVENTION

The present invention provides an oil resistant package material and packages prepared therefrom wherein cyclodextrin is incorporated in or adjacent to a film layer of the package to reduce the permeation of oil out of the package. In one embodiment, the package material comprises a film layer comprising a polymer coordinated or bonded with a cyclodextrin compound in an amount sufficient to reduce the permeation of oil through the film layer as compared to a like film layer that does not contain cyclodextrin.

In another embodiment, an oil resistant packaging laminate is provided comprising a first layer comprising a migratable cyclodextrin and a second layer that is a film layer comprising a polymer capable of coordinating or bonding with a cyclodextrin compound upon exposure of the polymer to the cyclodextrin. The migratable cyclodextrin is present in the first layer in an amount sufficient to transport upon exposure to oil and coordinate or bond with the second layer to reduce the permeation of oil through the laminate as compared to a like laminate that does not contain cyclodextrin.

In another embodiment, a product package is provided comprising a closed package comprising a layer that is a film layer comprising a polymer capable of coordinating or bonding with a cyclodextrin compound and an oil or fat containing product comprising a migratable cyclodextrin compound disposed within the package. Upon migration of the oil or fat in the product to the package, cyclodextrin is transported to the film layer in an amount sufficient to coordinate or bond with the film layer to reduce the permeation of oil through the package as compared to a like product package that does not have a cyclodextrin compound disposed within the package.

The packaging material and packaging made therefrom of the present invention provides advantages in reduction of permeation of oil through the package. The present package material configuration in certain embodiments uses unique materials that do not have the potential disadvantages of previously used oil permeation control materials. In certain embodiments, the packaging construction can be provided in a format that is free of fluorocarbons. In other constructions the packaging materials are provided using ingredients that are highly suitable for contact with food. Embodiments of the present invention additionally provide effective packaging exhibiting reduction of permeation of oil through the package using simple material constructions. Additionally, embodiments of the packaging material of the present invention can be readily incorporated into existing product constructions.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

Figure 1:
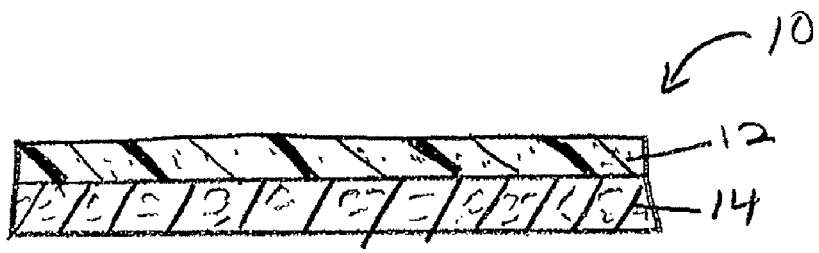
FIG. 1 is an edge view of a packaging material construction of the present invention.

Turning now to the drawings, FIG. 1 shows an embodiment of an oil resistant package material 10 comprising a film layer 12 laminated on a fibrous web support material 14. The film layer 12 comprises a polymer that is coordinated or bonded with a cyclodextrin compound in an amount sufficient to reduce the permeation of oil through the film layer as compared to a like film layer that does not contain cyclodextrin.

The complex formed by coordination or bonding of these moieties affords a far greater oil permeation reduction effect than would be expected by simple weight ratios of oil to cyclodextrin that would be expected from a mere oil trapping by the cyclodextrin. While not being bound by theory, it is believed that the cyclodextrin may form an enhanced matrix with the polymer of the film layer, and/or the cyclodextrin provides affinity sites at the film layer that impedes passage of the oil through the packaging material.

In one embodiment, the polymer comprises functionality that will coordinate or bond with cyclodextrin. In another embodiment, the polymer comprises functionality that will coordinate or bond with the hydroxyl functionalities of the cyclodextrin. Examples of such functionalities include carbonyl-containing functionality, and particularly hydroxy functionality and acid functionality. In an embodiment of the present invention, the coordination of the polymer with the cyclodextrin is by hydrogen bonding.

The polymers that can be used in the present invention in one embodiment selected from the group consisting of vinyl acetate copolymer, starch, acrylic polymers comprising hydroxy and/or acidic functionality, polyurethane polymers and mixtures thereof. When the packaging material is intended to be used for packaging food products, the components are preferably selected from food grade materials.

The cyclodextrin used in the present invention is selected from alpha-cyclodextrin, beta-cyclodextrin, gamma-cyclodextrin, derivatives and/or mixtures thereof. Cyclodextrins comprise a doughnut shaped or cyclical structure composed of a number of alpha-D-glucose units (typically 6-8) having a hydrophilic exterior and a hydrophobic interior. Cyclodextrins are generally water soluble, although alpha-cyclodextrin is likely more water soluble than beta-cyclodextrin or gamma-cyclodextrin, and free flowing crystalline powders that are substantially if not completely odorless and white in color.

In one embodiment of the invention, at least a portion and preferably substantially all the cyclodextrin is alpha-cyclodextrin. Alpha-cyclodextrin is a cyclized ring of six alpha 1,4 linked glucose units. Alpha-cyclodextrin has a cavity dimension of about 0.50×0.79 (nm). The solubility of alpha-cyclodextrin in water is good and at 25° C. is about 14 (gm/100 mL). In contrast, the native solubility of cyclodextrins in fats is poor. A useful alpha-cyclodextrin is commercially available in the United States from Wacker Specialties, Adrian, Mich. 49221 and sold under the trademark CAVAMAX® W6 Wacker-Chemie, Burghausen, Germany.

In another embodiment of the invention, alpha-cyclodextrin is used in combination or synergistically with beta-cyclodextrin and/or gamma-cyclodextrin, in particular ratios dependent upon the requirements of the ultimate user. In an exemplary embodiment, alpha-cyclodextrin can be used individually or can be combined with between 0-50% by weight beta-cyclodextrin or gamma-cyclodextrin or with between 0.1 to about 40% by weight beta-cyclodextrin. Beta-cyclodextrins and gamma-cyclodextrins are also available from Wacker Specialties, Adrian, Mich., USA, 49221.

One method of preparing cyclodextrins includes enzymatic treatment. Enzymatic degradation or treatment of the starch to produce cyclodextrins useful in the present invention is done through the use of cyclodextrin glucosyltransferase (CGTase, EC 2.4.1.19) or other enzymes, which results in a cyclic ring of sugar. In one method, cyclodextrins are produced by the action of cyclodextrin glucosyltransferase on hydrolyzed starch syrups at neutral pH (6.0-7.0) and moderate temperature (35-40° C.). Alternatively, cyclodextrins can be produced in planta by the expression of the gene encoding CGTase in the food plant of interest.

In one of the embodiments of the present invention, an inclusion complex is formed of the cyclodextrin with a compound that will at least in part coordinate with the hydrophobic core of the cyclodextrin prior to incorporation in the packaging material of the present invention. A preferred class of inclusion complex comprises glycerides having at least one fatty acid ester functionality. While not being bound by theory, it is believed that when a component to be included in the cyclodextrin as an inclusion complex comprises a hydrophobic tail, the resulting inclusion complex when coordinated with the polymer affords a far greater oil permeation reduction effect than would be expected by simple weight ratios of oil to cyclodextrin. This is particularly the case since the hydrophobic core of the cyclodextrin that would theoretically trap the oil is occupied by the included compound. While not being bound by theory, it is believed that the cyclodextrin having an inclusion complex may form a yet more enhanced matrix with the polymer of the film layer, and/or the cyclodextrin inclusion complex provides affinity sites at the film layer that impedes passage of the oil through the packaging material.

In an embodiment of the present invention, the inclusion complex is formed of the cyclodextrin with a glyceride having at least one fatty acid ester functionality. In a preferred embodiment, the compound to be included in the inclusion complex is alpha monoglycerol stearate (AMGS).

In an embodiment of the present invention, the cyclodextrin is hydrated prior to contact with the polymer of the packaging material. While not being bound by theory, it is believed that the presence of water assists in formation of the matrix through facilitation of hydrogen bonding between the cyclodextrin and the polymer. Thus, in the embodiment where the film layer comprises both the polymer and the cyclodextrin in a coordinated or bonded configuration, the cyclodextrin is provided in a hydrated form prior to addition to the polymer during the film formation process. Alternatively, the film is prepared from an aqueous film formation composition, and the cyclodextrin is hydrated in situ during the film formation process.

The fibrous web support material 14 is optional, and in embodiments where the fibrous web support material is employed is selected from any appropriate material the provides the appearance or physical support characteristics desired for the particular use of the package material. Examples of advantageous fibrous web support materials include papers, such as kraft papers, and like cellulosic fiber materials. Web materials, such as nonwoven or woven fabric materials from natural or synthetic fibers, are also contemplated. In an embodiment of the present invention, the fibrous web support material may provide a printable surface to receive images, printing, and the like to provide a package material having enhanced appearance. Particularly advantageous web materials that can be employed in embodiments of the present invention are heat resistant web materials, such as heat resistant paper stock.

In one embodiment, the cyclodextrin is provided in the film material in an amount of about 0.3 to 95%, more preferably 0.5 to 50%, and yet more preferably 1 to 10% of the total film material.

Figure 2:
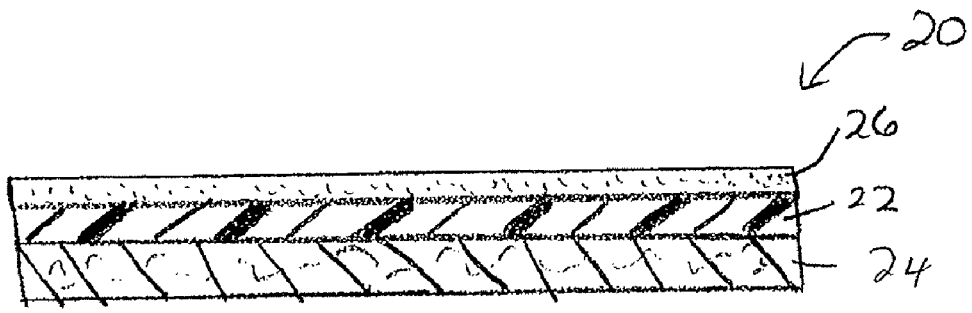
FIG. 2 is an edge view of an alternative packaging material construction of the present invention.

FIG. 2 shows an embodiment of an oil resistant package material 20 comprising a film layer 22 laminated on a fibrous web support material 24, and migratable cyclodextrin layer 26 laminated on film layer 22. Film layer 22 comprises a polymer capable of coordinating or bonding with a cyclodextrin compound upon exposure of the polymer to the cyclodextrin. The migratable cyclodextrin layer 26 comprises cyclodextrin in matrix wherein, upon exposure to oil, the cyclodextrin transports with the oil and coordinates or bonds with the polymer in film layer 22 in a manner to reduce the permeation of oil through the laminate as compared to a like laminate that does not contain cyclodextrin. The matrix of migratable cyclodextrin layer 26 may be any suitable oil soluble, or optionally the cyclodextrin may be applied to the top of film layer 22, for example from an aqueous coating solution, and dried in place to a degree that the cyclodextrin with remain associated with the film layer 22 substantially without an additional matrix material.

The cyclodextrin is in one embodiment pre-hydrated prior to assembly of the packaging material so that a coordination complex of cyclodextrin with water is formed to provide water molecules that are associated with the cyclodextrin.

Cyclodextrin can be hydrated, for example, by adding the cyclodextrin to water in an amount up to the solubility of the cyclodextrin in the water at the temperature of mixing. In this solubilization step, the cyclodextrin and water are preferably advantageously mixed at weight ratios from about 1:10 to about 10:1, or from about 5:1 to about 1:5, or from about 2:1 to about 1:2 of cyclodextrin to water. Advantageously, the resulting hydrated cyclodextrin is provided at a relatively low water content, so that a majority of the water in the system is coordinated with the cyclodextrin. In other systems where the cyclodextrin is hydrated, the water is present in excess.

The hydrated cyclodextrin after mixing in a preferred embodiment is in the form of a clear solution. By "clear" is meant that the solution is substantially free of any undissolved solids. This embodiment is preferred because a clear solution indicates that substantially all of the cyclodextrin is effectively solubilized.

In one embodiment, the cyclodextrin is provided in the cyclodextrin layer 26 at an equivalent coating weight of about 0.3 to 95% of the coating weight per sq. meter of the polymer-containing layer, preferably 0.5 to 50% of the coating weight per sq. meter of the polymer-containing layer, and more preferably 1 to 10% of the coating weight per sq. meter of the polymer-containing layer.

Figure 3:
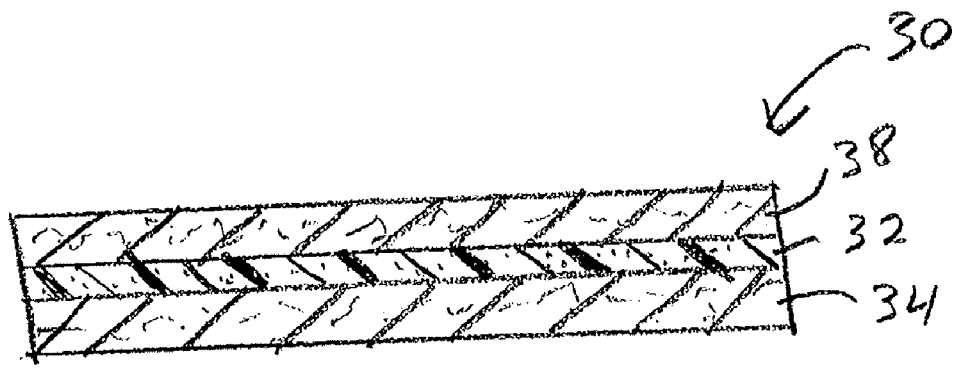
FIG. 3 is an edge view of an alternative packaging material construction of the present invention.

FIG. 3 shows an embodiment of an oil resistant package material 30 comprising a adhesive layer 32 bonding a first fibrous web support material 34 to a second fibrous web support material 38. Adhesive layer 32 comprises a polymer that is coordinated or bonded with a cyclodextrin compound in an amount sufficient to reduce the permeation of oil through the adhesive layer as compared to a like adhesive layer that does not contain cyclodextrin. In a preferred embodiment, adhesive layer 32 is formed from a water-based adhesive. Examples of water-based adhesives include adhesives comprising a vinyl acetate copolymer and starch.

Figure 4:
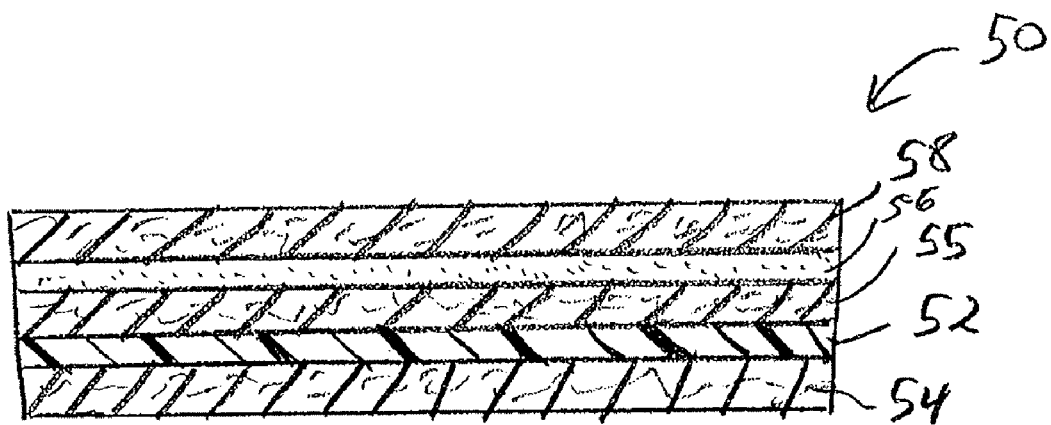
FIG. 4 is an edge view of an alternative packaging material construction of the present invention.

FIG. 4 shows an embodiment of an oil resistant package material 50 comprising an adhesive layer 52 bonding a first fibrous web 54 to a second fibrous web 55. Adhesive layer 52 comprises a polymer capable of coordinating or bonding with a cyclodextrin compound upon exposure of the polymer to the cyclodextrin. Migratable cyclodextrin layer 56 is located between second fibrous web 55 and third fibrous web 58.

Migratable cyclodextrin layer 56 comprises cyclodextrin in matrix wherein, upon exposure to oil, the cyclodextrin transports with the oil and coordinates or bonds with the polymer in adhesive layer 52 in a manner to reduce the permeation of oil through the laminate as compared to a like laminate that does not contain cyclodextrin. The matrix of migratable cyclodextrin layer 56 may be any suitable oil soluble, or optionally the cyclodextrin may be applied to the top of second fibrous web 55, for example as a "dusting" on top of second fibrous web 55 or cast from an aqueous coating solution, and dried in place to a degree that the cyclodextrin with remain associated with the second fibrous web 55 substantially without an additional matrix material. In an alternative embodiment of the present invention, the second fibrous web 55 is treated with a cyclodextrin-containing solution so that the cyclodextrin is imbibed within the second fibrous web 55 and is not apparent as a separate layer in the package material construction.

In one embodiment, the cyclodextrin is provided in the cyclodextrin layer 56 at an equivalent coating weight of about 0.3 to 95% of the coating weight per sq. meter of the polymer-containing layer, preferably 0.5 to 50% of the coating weight per sq. meter of the polymer-containing layer, and more preferably 1 to 10% of the coating weight per sq. meter of the polymer-containing layer.

In an embodiment of the present invention, the package material of FIG. 18 is used to contain a product comprising oil, where third fibrous web 58 is provided as the inside of the package. Permeation of the oil from the package is reduced as oil attempts to transport from the inner layers to the outer layers of the package. Thus, oil wicks or otherwise transports through third fibrous web 58, where it encounters migratable cyclodextrin layer 56. As the oil continues to wicks or otherwise transports through second fibrous web 55, it transports at least a portion of the cyclodextrin in migratable cyclodextrin layer 56. This cyclodextrin is exposed to the polymer capable of coordinating or bonding with a cyclodextrin compound in adhesive layer 52, and is believed to then coordinate or bond in a manner to reduce the permeation of oil through the package material as compared to a like package material that does not contain cyclodextrin.

It will be appreciated that additional layers may be provided in the packaging material laminate construction as desired, either on the outside of the layers shown in the package materials described herein or interposed between the layers shown in the package materials described herein. Examples of such additional layers include in particular microwave susceptor layers. Optionally, previously known greaseproof layers, such as fluorocarbon coated papers and the like may additionally incorporated in the packaging materials of the present invention to provide supplemental resistance to permeation of oil through the package material.

Figure 5:
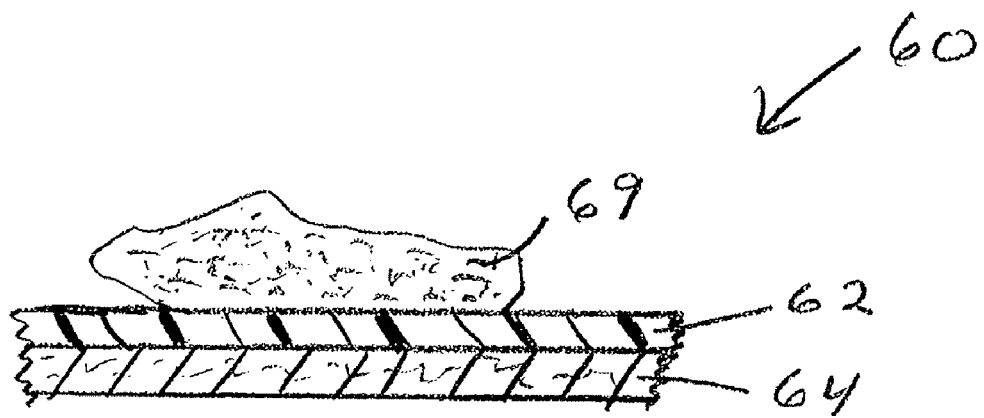
FIG. 5 is a partial edge view of a package construction of the present invention.

FIG. 5 shows a partial view of oil resistant product package 60 constructed from a laminate comprising a film layer 62 laminated on a fibrous web support material 64. Food product 69 is disposed within package 60. Film layer 62 comprises a polymer capable of coordinating or bonding with a cyclodextrin compound upon exposure of the polymer to the cyclodextrin. In use, cyclodextrin from food product 69 is transported to the polymer in film layer 22 in a manner to reduce the permeation of any oil present in food product 69 as compared to a like laminate that is not exposed to cyclodextrin.

The cyclodextrin may be located anywhere in the package, or optionally may be provided as a coating on food product 69 or intimately mixed in food product 69. In one embodiment, the cyclodextrin is provided as a coordination complex with oil, as described in U.S. patent application Ser. No. 11/158,747; Titled: VISCOUS FAT COMPOSITIONS HAVING LOW AMOUNTS OF TRANS-FAT, METHODS AND PRODUCTS, filed JUN. 22, 2005. Additional processes for providing cyclodextrin as a coordination complex with oil are described in U.S. patent application Ser. No. 60/753,458; Titled: METHOD OF MAKING COMPLEXED FAT COMPOSITIONS; filed Dec. 22, 2005.

In another embodiment, the cyclodextrin is pre-hydrated prior to assembly of the package or alternatively hydrated in situ in the package so that a coordination complex of cyclodextrin with water is formed to provide water molecules that are associated with the cyclodextrin.

In one embodiment, the cyclodextrin is provided in the package in an amount that would provide a coating weight of about 0.3 to 95% of the coating weight per sq. meter of the polymer-containing layer, preferably 0.5 to 50% of the coating weight per sq. meter of the polymer-containing layer, and more preferably 1 to 10% of the coating weight per sq. meter of the polymer-containing layer, based on the surface area of the interior of the package if the cyclodextrin were coated uniformly on the interior package surface.

The present invention is particularly advantageous in reduction of permeation of oil through packaging materials. Specific oils contemplated include fat components selected from oils and shortenings. Examples of such oils can include oil ingredients from vegetable, dairy and marine sources including butter oil or butterfat, soybean oil, corn oil, rapeseed or canola oil, copra oil, cottonseed oil, fish oil, safflower oil, olive oil, sunflower oil, peanut oil, palm oil, palm kernel oil, coconut oil, rice bran oil and other plant derived oils such as vegetable or nut oils. Examples of shortenings include animal fats such as lards, butter and hydrogenated vegetable oils such as margarine. Mixtures of different fats are also contemplated.

In an embodiment of the invention, the oil is selected from soybean oil, high-oleic sunflower oil, high-linoleic soybean oil, palm oil, palm kernel oil or coconut oil. Particularly advantageous oils include low linolenic, high stearic soybean oil; canola oil; high or mid oleic canola oil; high or mid oleic sunflower oil, rice bran oil; and hydrogenated rapeseed oil.

An embodiment of oil contemplated in the present invention comprises fat having a viscosity greater than about 12,500 cP at room temperature (i.e. 25° C.) measured relative to part number 12500 cps available from Brookfield Engineering Laboratories, Inc., 11 Commerce Boulevard, Middleboro, Mass., USA, 02346. An embodiment of oil contemplated in the present invention has a Solid Fat Content of greater than 15 at 21.1° C. Examples of solid fat compositions include animal fats such as lard, butter, and hydrogenated vegetable oils such as margarine. The fats can be emulsified or stabilized with mono- or diglycerides or other emulsifiers known in the art. Examples of emulsifiers include fully hydrogenated soybean oil mono-, di-, or tri-glyceride; mono-, di-, or tri-stearate, sodium stearyl-2-lactylate, and mixtures thereof.

Additionally, an embodiment of oil contemplated in the present invention comprise adjuvants such as colorants, flavorants, texture modifiers, preservatives, stabilizers, and the like, designed to improve the taste, appearance and nutritional properties of the finished products. If present, each such adjuvant ingredient can in one embodiment of the invention be present in an amount ranging from about 0.01% to about 5% of the fat product.

The present packaging material finds particular suitability for use in connection with consumer food products. Examples of such consumer food products include fried snack foods such as potato or corn chips, taco shells and the like; oil containing food products such as chocolate, candy, biscuits and the like; and uncooked, partially cooked or cooked and packaged to be reheated products such as pizza, fried fish portions and the like. Additionally, the present packaging material can be used to fabricate temporary service or cooking products, such as disposable platters and containers for microwave or convenience baking applications.

While particular attention is thus paid to such consumer food products in the present description, the skilled artisan will appreciate that the invention also can find suitability for use in connection with other product applications. For example, the present application can find usefulness in the provision of animal feed products especially for common companion animals such as dogs and domestic cats.

The present packaging can also find usefulness in the provision of other non-food products, such as cosmetics (e.g., hand crèmes and lotions), cleaning products (e.g. soaps or shampoos), or other viscous surfactant compositions that are based upon fatty triglycerides, e.g. paints using linseed oil as drying oil. In still other applications, the packaging can be used for product that are oils or that contain oils that are inedible, such as those that are petroleum based. Additionally, the packaging materials of the present invention can be used to prepare containers to receive oil waste products, such as garbage bags, storage containers, and the like.

In an embodiment of the invention, the packaging material is utilized for delivery of a food product. In an embodiment of the invention, the food product is provided as a packaged food product, either in bulk, in multiple servings (i.e. from about 2 to about 20 servings) or as single serving. The thus packaged food product can be provided in the cooked state, or the uncooked state. Examples of such food products include those that are packaged for heating by a non-manufacturing consumer. One particular example of a product packaging of the present invention finds benefit when used for products that are packaged for microwave heating. In a preferred aspect of the present invention, the packaging material is used for packaging microwave popcorn. Exemplary constructions of microwave popcorn bags are known in the art, for example as described in U.S. Pat. No. 5,679,278, as well as U.S. Pat. Nos. 5,044,777; 5,081,330; 5,195,829; 6,049,072; and 6,396,036. Popcorn may additionally be provided in tubs, for example as described in U.S. Pat. Nos. 5,008,024; 5,097,107; 5,834,046; and 6,126,976. The manner of substitution of the various embodiments of the present invention for previously used sealants in such packaging constructions will now be apparent to the skilled artisan.

In an embodiment of the present invention, the package material is provided in roll stock form for subsequent conversion to a packaging configuration. The ultimate packaging configuration comprising the packaging material as described herein may optionally have a portion of the total package constructed from the presently described packaging material. For example, packaging that is of a configuration where only a portion of the package is expected to be exposed to oil, such as the bottom of the package, may optionally be constructed so that portion is prepared from the present packaging material, and other portions are prepared using alternative materials. The film layer component of the present invention may optionally be particularly located and/or augmented at folds, creases or other critical portions of the package wherein the integrity of the package may be compromised in design or during manufacture. In another embodiment of the present invention, the package is constructed completely from the present packaging material.

The use of each of the described embodiments of the present invention in reducing the permeation of oil therethrough is specifically contemplated as an embodiment of the present invention.

EXAMPLES

Representative embodiments of the present invention will now be described with reference to the following examples that illustrate the principles and practice of the present invention.

Grease Resistance Evaluation

Grease resistance is determined with test based on the Ralston-Purina test for pet food materials; RP-2 Test, Ralston-Purina Company, Packaging Reference Manual Volume 06, Test Methods. In the RP-2 test, cross-wise creased test papers that have been coated with the indicated coating compositions are placed over an evaluation grid subsheet imprinted with 100 squares. Five grams of sand are placed in the center of the crease. A mixture of Safflower oil with a small amount of oil soluble, food-grade red dye for visualization is pipetted onto the sand and the samples are maintained at 60° C. for 24 hours. The evaluation of grease resistance is determined by measuring the stain on the subsheet caused by permeation of the colored oil through the test papers. The present evaluation differs from the original RP-2 test in that the size of the stain is presently measured in inches, rather than noting the percentage of squares stained as carried out in the RP-2 test. The degree of grease proofness of each sample is classified in accordance with the Table below.

| Degree of Grease proofness | Approximate diameter of oil stain |
| --- | --- |
| A | None |
| B | Up to 1/8" |
| C | 1/8" to 1/4" |
| D | 1/4" to 1/2" |
| Poor | Over 1/2" |

Coating compositions were formulated using a commercially available water based adhesive, identified as 33913A adhesive from National Starch and Chemical Company. This adhesive is described as a polyvinyl acetate copolymer/starch blend adhesive.

The adhesive was coated as provided, or after mixing with alpha cyclodextrin ("AD") or with alpha cyclodextrin that had been complexed with alpha-monoglycerol stearate ("AMGS") as an inclusion complex. The AD/AMGS inclusion complex was prepared as follows:

| Complexation conditions: | | |
| --- | --- | --- |
| 180 | g ACD | 12% |
| 225 | g AMGS | 15% |
| 1095 | g Water | 73% |
| 1500 | Total | 100% |

1. Equilibrate water to 80° C.
2. Dissolve alpha-cyclodextrin (180 g) in deionized water (1095 g) (i.e 16.44% ACD in Water at this stage of preparation) using an overhead high-shear mixer (Lightnin)
3. Melt AMGS (225 g) in Microwave and add to mixture (~4 min. Microwave on High)
4. Increase mixing speed (~double rpm)
5. Mix for 1 hour
6. Centrifuge for 1 hour at 4000×g, room temperature.
   Beckman-Coulter Avanti J-HC Centrifuge
   Rotor=JS-5.0; Temp 25° C.
   Speed=3,657 RPM (4,000×g)
7. Isolate AD-AMGS layer from water
8. Dry in oven @ 50° C. (48 hrs)

Final Moisture=15%

The coating materials were formulated as follows:

Alpha Cyclodextrin("AD")/Adhesive Composition

| Description | Percent | Weight (g) |
| --- | --- | --- |
| Alpha Dextrin | 15 | 68.1 |
| Water | 5 | 22.7 |
| Adhesive | 80 | 363.2 |
| Total = | 100 | 454 |

AD/AMGS/Adhesive Composition

| Description | Percent | Weight (g) |
| --- | --- | --- |
| AD/AMGS | 20 | 90.8 |
| Water | 0 | 0 |
| Adhesive | 80 | 363.2 |
| Total = | 100 | 454 |

Grease resistance evaluations were performed as follows:

| Sample number | coating material | Degree of Grease proofness |
| --- | --- | --- |
| 1B (control) | Adhesive only Coating wt 4.2 | Poor (2½" diameter) |
| 3A (control) | Adhesive only Coating wt 5.0 | Poor (4¼" diameter) |
| 4B | Adhesive/AD/water | D (3/8" diameter) |

-continued

| Sample number | coating material | Degree of Grease proofness |
|---|---|---|
| 5A (control) | Coating wt 4.2<br>Adhesive only | D (¼" diameter)* |
| 9A | Coating wt 4.8<br>Adhesive/AD/water | B |
| 8B | Coating wt 7.8<br>Adhesive/AD/water | B |
| 10A | Coating wt 14.9<br>Adhesive/AD/water | A |
| 11A | Coating wt 4.7<br>Adhesive/AD/water | A |
| 12A | Coating wt 9.9<br>Adhesive/AD/AMGS | B |
| 13A | Coating wt 9.4<br>Adhesive/AD/AMGS | B |
| 14A | Coating wt 16.4<br>Adhesive/AD/AMGS | B |
| 15A | Coating wt 16.6<br>Adhesive/AD/AMGS | B |
| 16A | Coating wt 11.9<br>Adhesive/AD/AMGS | C |
| FC (prior art) | Coating wt 12.2 | D & Poor (¾" diameter) |

*poor performance may be due to imprecise coating uniformity.

As can be seen in the evaluation, the coating compositions comprising adhesive mixed with hydrated alpha cyclodextrin and adhesive mixed with an alpha cyclodextrin/AMGS inclusion complex provide substantial improvement in grease resistance as compared coating compositions comprising only adhesive and as compared to the prior art fluorocarbon coating.

All percentages and ratios used herein are weight percentages and ratios unless otherwise indicated. All publications, patents and patent documents cited are fully incorporated by reference herein, as though individually incorporated by reference. Numerous characteristics and advantages of the invention meant to be described by this document have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

The invention claimed is:

1. An oil resistant package material comprising a film layer comprising a polymer coordinated or bonded with a cyclodextrin compound in an amount sufficient to reduce the permeation of oil through the film layer as compared to a like film layer that does not contain cyclodextrin wherein the film layer is a water-based adhesive and comprises a vinyl acetate copolymer and starch.

2. The package material of claim 1, wherein the cyclodextrin is alpha cyclodextrin.

3. The package material of claim 1, wherein the cyclodextrin comprises an inclusion complex.

4. The package material of claim 3, wherein the inclusion complex is formed of the cyclodextrin with a glyceride having at least one fatty acid ester functionality.

5. The package material of claim 3, wherein the inclusion complex is formed of the cyclodextrin with alpha monoglycerol stearate.

6. A product package comprising
   a) a closed package; and
   b) an oil or fat containing product disposed within the package;
   wherein the package comprises the package material of claim 1.

7. A packaged microwave popcorn product comprising
   a) a closed microwave popcorn package;
   b) unpopped popcorn kernels disposed within the package; and
   c) an oil/fat slurry disposed within the package; wherein the package comprises the package material of claim 1.

8. The package material of claim 1, wherein the cyclodextrin is pre-hydrated prior to assembly of the package material.

9. The package material of claim 8 wherein the pre-hydrated cyclodextrin comprises cyclodextrin and water at a weight ratio from 1:10 to 10:1.

10. The package material of claim 8 wherein the pre-hydrated cyclodextrin comprises cyclodextrin and water at a weight ratio from 5:1 to 1:5.

11. The package material of claim 8 wherein the pre-hydrated cyclodextrin comprises cyclodextrin and water at a weight ratio from 2:1 to 1:2.

12. The package material of claim 1 wherein the cyclodextrin is hydrated in situ in the package.

* * * * *